United States Patent [19]

Nagano et al.

[11] Patent Number: 5,455,686
[45] Date of Patent: Oct. 3, 1995

[54] FACSIMILE APPARATUS WITH PAPER SAVING FUNCTION

[75] Inventors: Junichi Nagano, Kasuga; Kunio Koutsuki, Fukuoka, both of Japan

[73] Assignee: Matsushita Electric Industrial Co., Ltd., Japan

[21] Appl. No.: 300,843

[22] Filed: Sep. 6, 1994

Related U.S. Application Data

[63] Continuation of Ser. No. 64,659, May 21, 1993, abandoned.

[30] Foreign Application Priority Data

May 22, 1992 [JP] Japan ................................ 4-130453
Jul. 20, 1992 [JP] Japan ................................ 4-192008

[51] Int. Cl.$^6$ ........................... H04N 1/00; H04N 1/21
[52] U.S. Cl. ........................ 358/404; 358/468; 358/296
[58] Field of Search .................... 358/468, 436–439, 358/498, 451, 404–406, 442, 444, 296; 395/112, 113; H04N 1/393, 1/00

[56] References Cited

U.S. PATENT DOCUMENTS

| | | |
|---|---|---|
| 4,876,609 | 10/1989 | Ogura . |
| 4,907,094 | 3/1990 | Mishima et al. ................ 358/404 |
| 5,019,916 | 5/1991 | Ogura ............................ 358/404 |
| 5,257,035 | 10/1993 | Funahashi et al. ............... 358/404 |
| 5,294,999 | 3/1994 | Kuwahara ...................... 358/404 |

FOREIGN PATENT DOCUMENTS

| | | |
|---|---|---|
| 1-132262 | 5/1989 | Japan . |
| 2-76471 | 3/1990 | Japan . |
| 2-100537 | 4/1990 | Japan . |
| 2-288762 | 11/1990 | Japan . |
| 3-49466 | 3/1991 | Japan . |
| 3-239064 | 10/1991 | Japan . |

*Primary Examiner*—Scott A. Rogers
*Assistant Examiner*—Kim Yen Vu
*Attorney, Agent, or Firm*—Parkhurst, Wendel & Rossi

[57] ABSTRACT

A first facsimile apparatus effects a paper saving printing on the basis of the received video data for saving consumption of a recording paper by the contraction-printing in the longitudinal direction of the recording paper and it stores the video data in paper saving mode. The user can obtain a non-contracted copy using the stored video data. A second facsimile apparatus, in the paper saving mode, only prints a message information portion and a file number generated in response to the call on the recording paper in response to every facsimile call to form a list of reception of facsimile calls and stores the received video data in a memory in associated with the file number. The user can selectively print out the stored video data with reference to the list of facsimile calls.

12 Claims, 17 Drawing Sheets

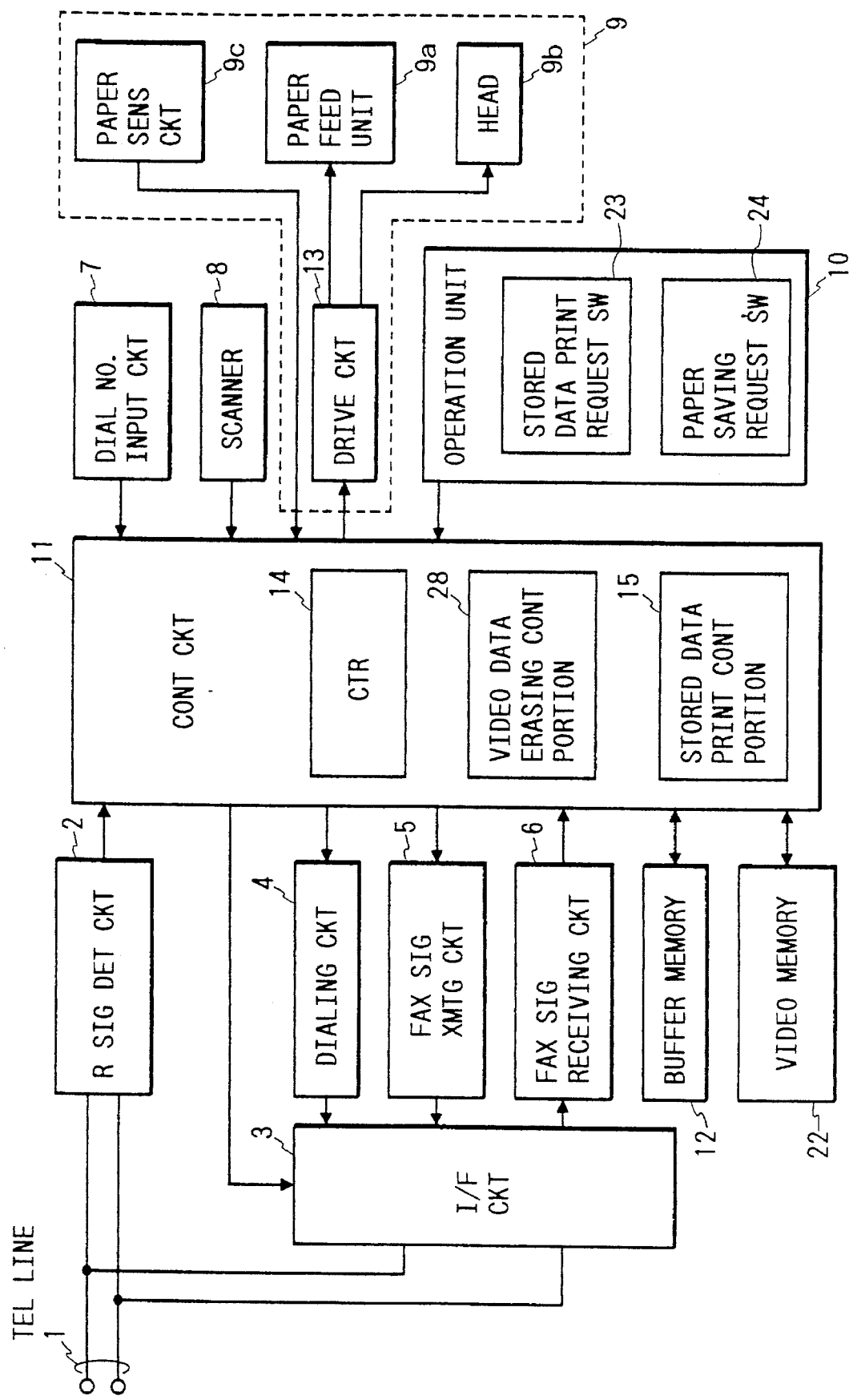

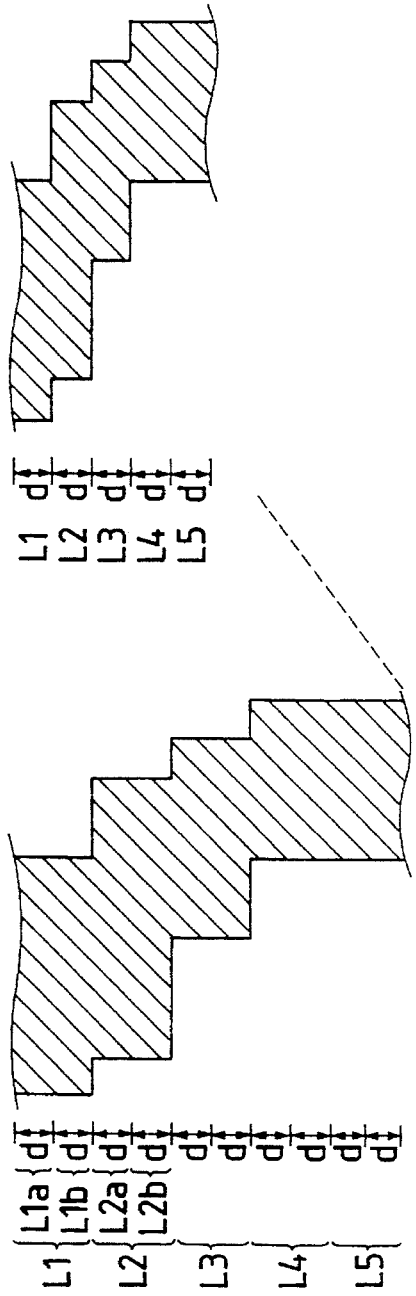
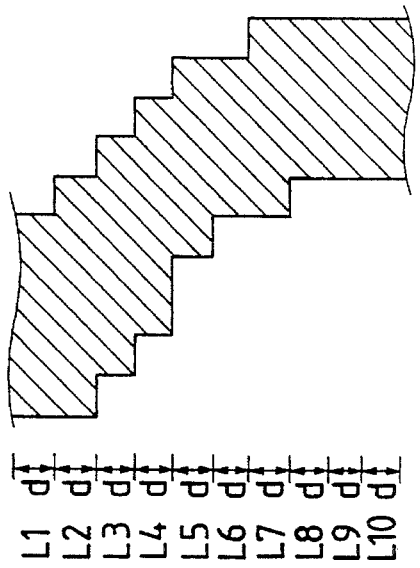

FIG. 5

Fax Correspondence

Date:
Page:

TO:
FROM:
RE:

FIG. 6

Fax Correspondence

Date:
Page:

TO:
FROM:
RE:

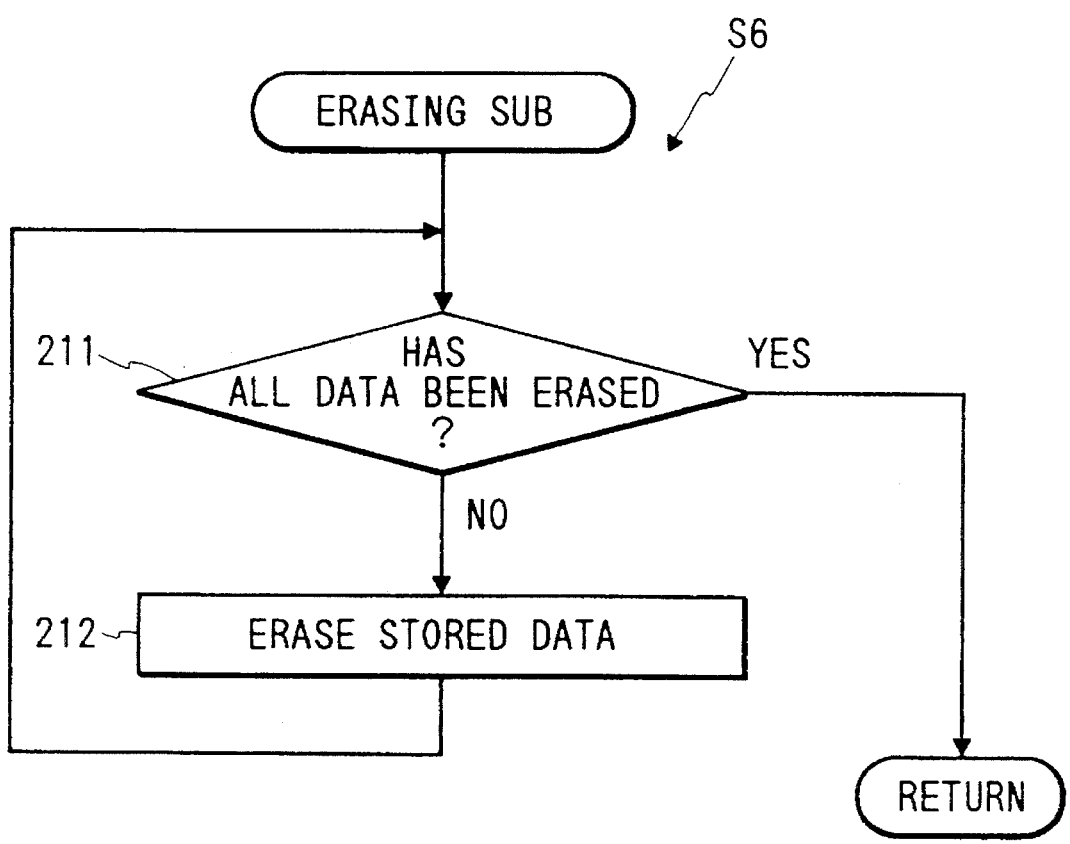

FIG. 12

|  | 51 | 52 | 53 |
|---|---|---|---|
| 1 | '92-2-28 10:00 | A CORP | TEL NO:092 123 1111 |
| 2 | '92-2-28 12:20 | B CORP | TEL NO:091 923 5511 |
| 3 | '92-2-28 17:23 | C CORP | TEL NO:092 823 6611 |
| 4 | '92-2-28 20:03 | D CORP | TEL NO:093 723 5111 |
| 5 | '92-2-29 07:11 | E CORP | TEL NO:094 623 7111 |
| 6 | '92-2-29 11:31 | F CORP | TEL NO:095 523 1311 |
| 7 | '92-2-29 18:50 | G CORP | TEL NO:096 423 1181 |

29

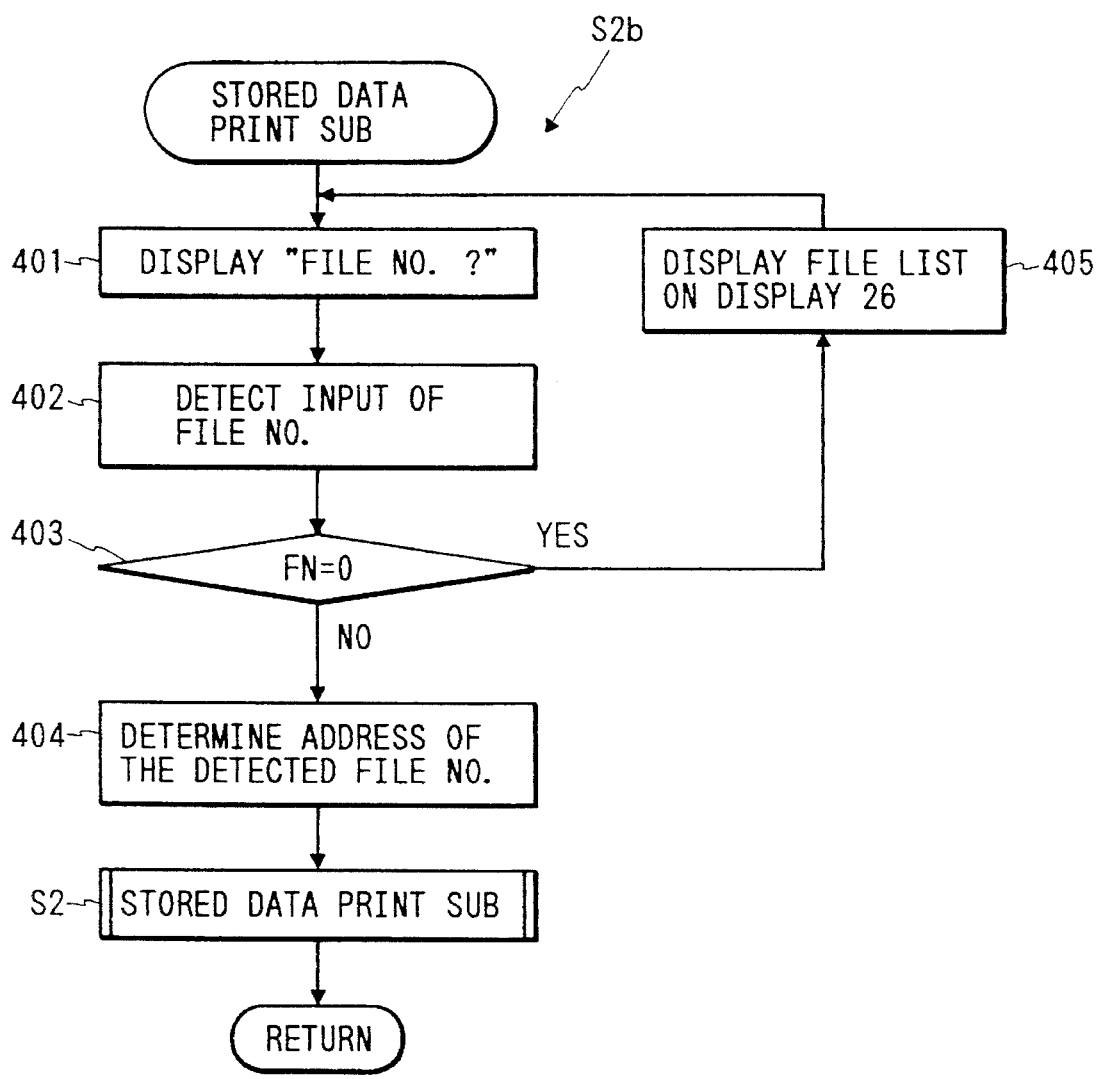

FACSIMILE APPARATUS WITH PAPER SAVING FUNCTION

This is a continuation of application Ser. No. 08/064,659 filed May 21, 1993, now abandoned.

BACKGROUND OF THE INVENTION

1. Field of the Invention

This invention relates to a facsimile apparatus with a paper saving function.

2. Description of the Prior Art

A facsimile apparatus with a paper saving function is known. Such a prior art facsimile apparatus with a paper saving function can record a transmitted video signal indicative of a copy with the paper feeding rate reduced in the paper saving mode.

In the normal mode, such a prior art facsimile apparatus feeds a recording paper such that reproducing size ratios in the horizontal direction and the vertical direction (paper feeding direction) are 1:1. However, in order to save the recording paper, for example, to prevent the running out of the recording paper during reception of transmitted facsimile signal, a paper consumption can be reduced by reducing the paper feeding rate. This mode is referred to as the paper saving mode.

FIG. 14 is a block diagram of such a prior art facsimile apparatus with the paper saving function.

This prior art facsimile comprises an interface (I/F) circuit 32 for communicating with a telephone line 31, facsimile (FAX) signal receiving circuit 33 for receiving a facsimile signal incoming from the telephone line 31, a control circuit 35 for controlling respective portions in this apparatus, a paper saving mode requesting circuit 34 for setting a paper saving mode requesting flag to the control circuit 35, a paper running out detection circuit 37 for detecting whether an amount of the remaining recording paper is less than a given value, and a printer 36 for recording the received facsimile signal on a recording paper.

FIG. 15 shows a flow chart for showing the operation of the prior art facsimile apparatus shown in FIG. 14.

In step 21, the control circuit 35 detects a transmitted facsimile signal incoming from the telephone line 31. In the following step 22, the control circuit 35 judges whether a paper saving mode requesting signal from the paper saving mode requesting circuit 34 is present and whether or not the paper saving printing is necessary by checking whether or not the amount of the remaining recording paper is less than the given value through the paper running out detection circuit 37. If the paper saving mode signal is present and the amount of the remaining recording paper is less than the given value, the control circuit 35 executes a half size printing, i.e., the received facsimile signal is recorded with the paper feeding rate reduced to ½. In step 22, the answer is NO, the control circuit 35 executes the normal size printing in step 23. After steps 23 and 24, the control circuit 35 terminates the communication and printing operation in step 25.

However, there is a problem that if the facsimile signal is recorded in the half size printing mode due to the running out of the recording paper as well as if the user desires to obtain the received copy printed in the normal size mode, the user should request the calling party to send the copy again.

Another prior art facsimile apparatus having a video memory for storing the received facsimile signal is known. Such a prior art facsimile apparatus stores video data of all transmitted copies in the video memory. After reception of the transmitted copies, the user can print out the stored copies on the recording paper in the normal size printing mode. However, there is a problem that the capacity of the video memory will be large because all copies should be stored or there is a problem that the risk that the running out of the video memory may occur during receiving the facsimile signal is high. Moreover, in such prior art facsimile apparatus, the stored data of copies is erased or caused to be invalid if a printed copy is present.

SUMMARY OF THE INVENTION

The present invention has been developed in order to remove the above-described drawbacks inherent to the conventional facsimile apparatus with the paper saving function.

According to the present invention there is provided a facsimile apparatus, comprising: a receiving circuit for receiving a facsimile signal transmitted through a telephone line; a printing unit for printing an image on the basis of the received video data included in the facsimile signal in first and second modes; a video memory for storing the received video data; a first control portion responsive to a mode signal for causing the printing unit to print the image on the recording paper on the basis of the received data when the mode signal is indicative of the first mode; and for causing the printing unit to print the image on the recording paper on the basis of the received data and causing the video memory to store the received data when the mode signal is indicative of the second mode, the printing unit printing the image on the recording paper with the image contracted in the longitudinal direction of the recording paper in the first mode compared with the image printed in the second mode; and a second control portion response to a command signal for reading the stored video data from the video memory and causing the printing unit to print the image on the basis of the read video data in the second mode.

According to the present invention there is also provided a facsimile apparatus responsive to a facsimile signal including video data and message information, comprising: a receiving circuit for receiving the video data; a printing unit; a memory; a first control circuit responsive to a mode signal and to every facsimile call for producing a file number; for causing the memory to store the received data in associated with the file number; reading a portion of the stored data with reference to the file number; and causing the printing unit to print a first image on the recording paper on the basis of the produced file number and read data when the mode signal indicates a first mode; and a second control circuit response to a command signal including a desired file number for reading the stored video data with reference to the desired file number from the memory and causing the printing unit to print the second image on the basis of the read video data.

BRIEF DESCRIPTION OF THE DRAWINGS

The object and features of the present invention will become more readily apparent from the following detailed description taken in conjunction with the accompanying drawings in which:

FIG. 1 is a block diagram of the first embodiment of a facsimile apparatus of this invention;

FIGS. 4A to 4C are illustrations of this invention for showing conditions of recording the video signal on the recording paper in the normal mode, the paper saving mode, and the fine mode respectively;

FIG. 5 is an illustration of the first embodiment of a printed copy prepared in the normal size printing mode;

FIG. 6 is an illustration of the first embodiment of a printed copy prepared in the half size printing mode;

FIG. 7B shows a flow chart of this invention for showing the erasing subroutine of the stored data;

FIG. 12 is an illustration of the second embodiment of the outputted copy;

FIG. 17 shows a partial flow chart of the facsimile apparatus of the second embodiment.

The same or corresponding elements or parts are designated as like references throughout the drawings.

DETAILED DESCRIPTION OF THE INVENTION

Figure 2A:
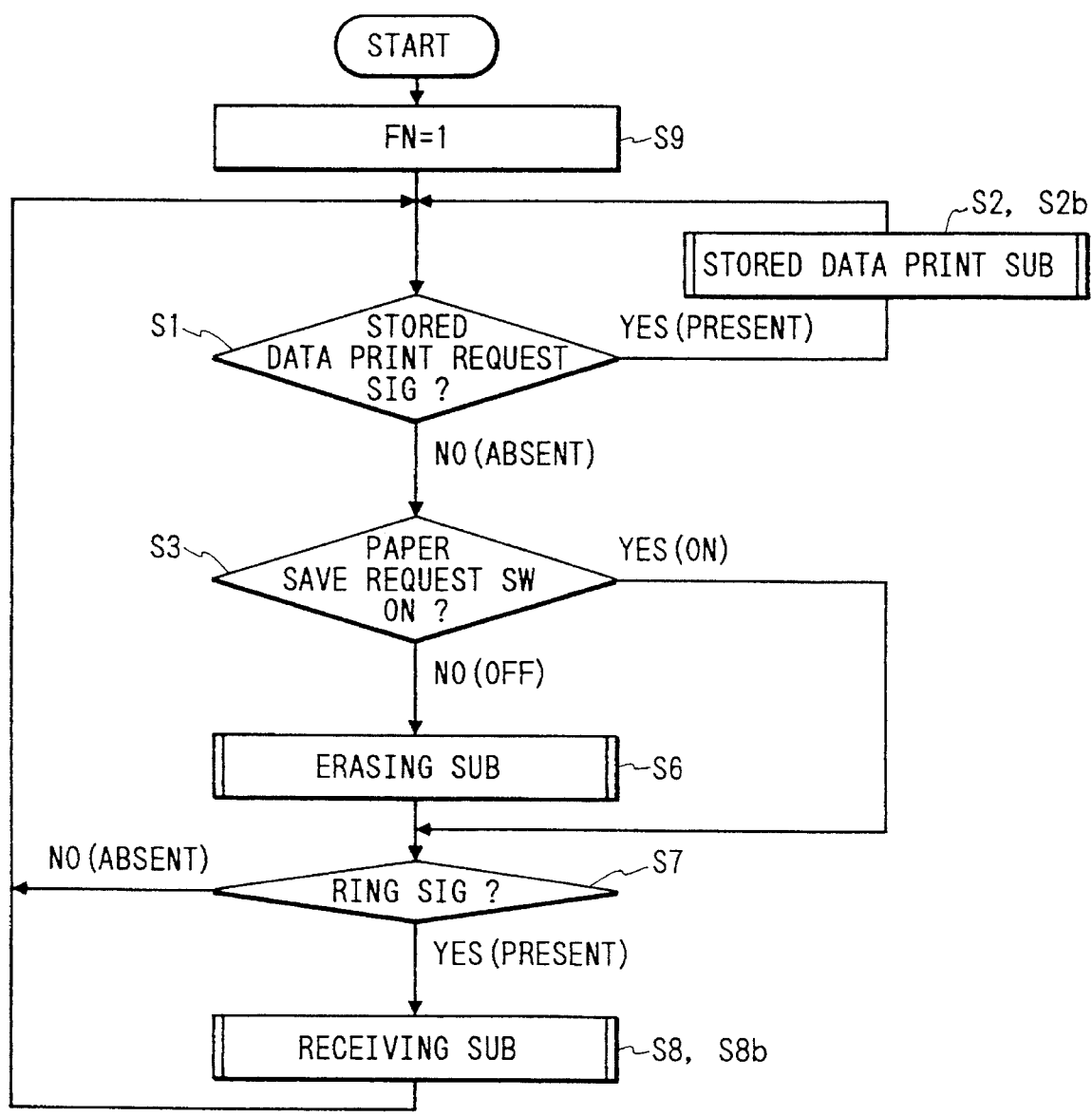
FIG. 2A shows a main flow chart of this invention which is commonly used in the first and second embodiments.

Hereinbelow will be described a first embodiment of this invention. FIG. 1 is a block diagram of the first embodiment of a facsimile apparatus of this invention.

The facsimile apparatus of the first embodiment comprises: a control circuit 11; a ring signal detection circuit 2 for detecting a ring signal sent through a telephone line 1 and for supplying a detected ring signal to the control circuit 11; an interface (I//F) circuit 3 for communicating with the telephone line 1; a dialing circuit 4 for sending a dial signal to the telephone line 1 through the interface circuit 3; a scanner 8 for reading a video information on a copy to produce a video signal; a facsimile signal transmitting circuit 5 for converting the video signal sent from the scanner via the control circuit 11 into a facsimile signal and for transmitting the facsimile signal to the telephone line 1 via the interface circuit 3; a facsimile signal receiving circuit 6 for receiving the facsimile signal sent through the telephone line 1 via the interface circuit 3 and for sending the received facsimile signal to the control circuit 11; a dial number input circuit 7 for inputting dial numbers to the dialing circuit 4 via the control circuit 11; a printer unit 9 having a paper feeding unit 9a, a thermal head 9b for printing the video signal on a recording paper, and a paper sensing circuit 9c; a drive circuit 13 for driving a step motor for feeding a recording paper and driving the thermal head 9b in response to control signals from the control circuit 11; an operation unit having a paper saving request switch 24 and stored data print request switch 23 for supplying a paper saving request signal and a stored data print request signal to the control circuit 11 respectively; a buffer memory 12 for storing the video signal of one line sent from the control circuit 11 and supplying the stored video signal to the control circuit 11; and a video memory 22 for storing for storing the video signal from the fax signal receiving circuit 6 via the control circuit 11. The control circuit 11 includes a counter 14, a video data erasing control portion 28, and a stored data printing control portion 15. In fact, the control circuit 11 comprises a microprocessor and the counter 14, the video data erasing control portion 28, and the stored data printing control portion 15 are realized by a program stored in the control circuit 11.

The ring signal detection circuit 2 detects the ring signal sent through the telephone line 1 and supplies the detected ring signal to the control circuit 11. The interface (I//F) circuit 3 communicates with the telephone line 1, that is, closes or release the telephone line 1 and couple to the facsimile transmitting circuit 5 and the facsimile signal receiving circuit 6 to the telephone line 1 under control of the control circuit 11. The dialing circuit 4 sends the dial signal generated by the dial number input circuit 7 to the telephone line 1 through the interface circuit 3 under control of the control circuit 11. The scanner 8 scans and reads video information on a copy to produce the video signal to supply the video signal to the facsimile signal transmitting circuit 5 through the control circuit 11 under control of the control circuit 11. The facsimile signal transmitting circuit 5 produces and transmits the facsimile signal to the telephone line 1 through the interface circuit 3 using the video data which is produced through run-length-conversion from the video signal from the scanner 8 by the control circuit 11. The facsimile signal receiving circuit 6 receives the facsimile signal sent through the telephone line 1 via the interface circuit 3 and sends the received facsimile signal to the control circuit 11. The control circuit 11 receives the transmitted facsimile signal through the telephone line 1 and converts the run-length-converted data into bit map data and stores the bit map data in the buffer memory 12. The dial number input circuit 7, i.e., a twelve-key unit, produces a dial number signal to the dialing circuit 4 via the control circuit 11 in response to manual operation by a user. The printer unit 9 records the video signal on the recording paper to reproduce a copy transmitted through the telephone line 1 by driving the paper feeding unit 9a and the thermal head 9b. The drive circuit 13 drives the step motor mentioned latter to feed the recording paper by a unit feeding amount at each printing of a horizontal scanning line and drives the thermal head 9b in response to control signals from the control circuit 11 using video signal from the buffer memory 12 by supplying drive signals to respective element of the thermal head 9b. The paper saving request switch 24 and the stored data print request switch 23 in the operation unit 10 respectively supply the paper saving request signal and the stored data print request signal to the control circuit 11 in response to a manual operation by the user. The buffer memory 12 stores the video signal of one line sent from the control circuit 11 and supplies the stored video signal to the printer unit 9 and/or the video memory 22 via the control circuit 11. The video memory 22 stores the video signal from the video signal (data) from the buffer memory 12 under the control of the control circuit 11 when the paper saving printing is carried out.

Figure 8:
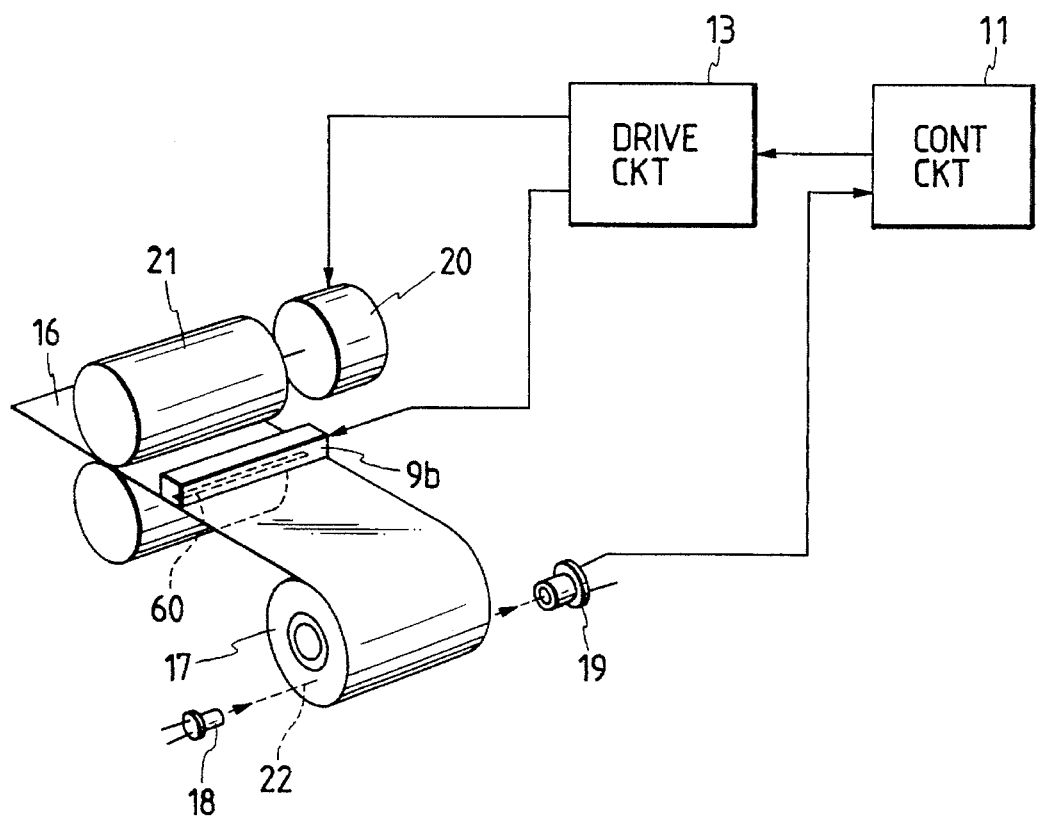
FIG. 8 is a perspective view of the printer unit of the first and second embodiments which is shown in FIG. 1.

FIG. 8 is a perspective view of the printer unit 9 shown in FIG. 1. The recording paper 16 supplied from a recording paper roll 17 mounted on a rotatable shaft (not shown) is pinched between a driving roller 21 and a driven roller 21b and is driven in the longitudinal direction of the recording paper, i.e., the vertical direction in the recording paper 16. The thermal head 9b is provided between the drive roller 21a and the recording paper roller 17 so as to contact with the recording paper. The thermal head 9b is arranged perpendicular to the longitudinal direction of the recording paper 16, i.e., in the horizontal direction in the recording paper 16. The drive roller 21a is driven by the step motor 20 in response drive pulses from the drive circuit 13. The thermal head 9b has a plurality of heating elements arranged in the vertical direction, that is, a thermal element array 60, each heating element being driven by the driving signal from the drive circuit 13. The drive circuit 13 is controlled by the control circuit 11. The paper sensing unit 9c comprises a light emitting device 18 for emitting a light beam and a photosensitive device 19 for receiving the light beam emitted from the light emitting device 18 and for supplying a paper sensing signal to the control unit 11. The light emitting device 18 and the photosensitive device 19 are arranged such that the photosensitive device 19 receives the light beam from the light emitting device 18 when an amount of the remaining recording paper in the recording paper roll 17 is less than a given value.

Figure 9:
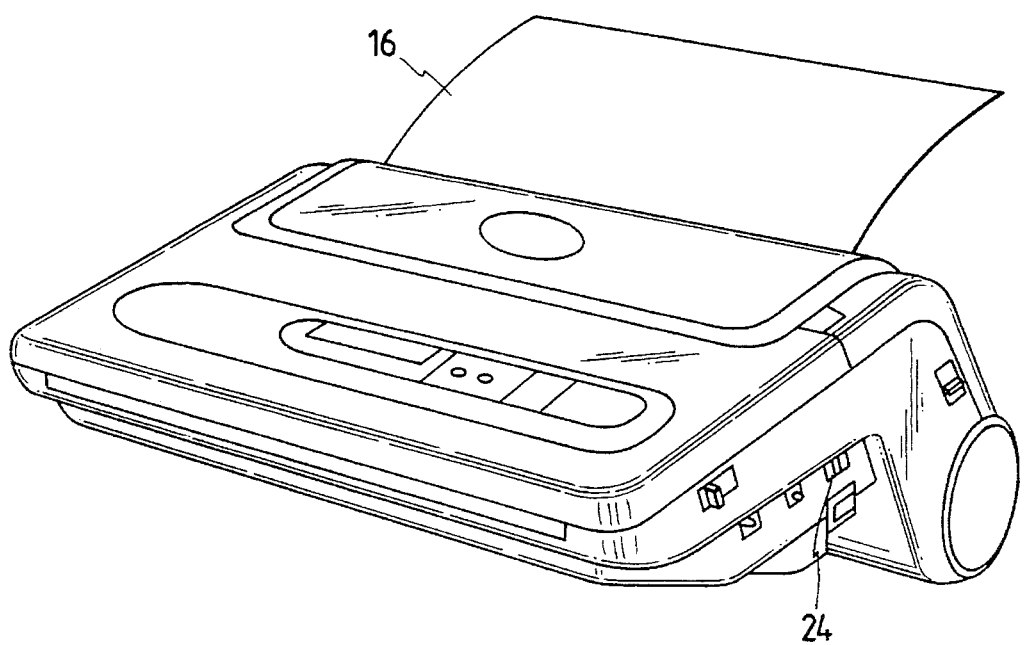
FIG. 9 is a perspective view of this invention for showing an exterior view of the facsimile apparatus.

FIG. 9 is a perspective view of this invention for showing an exterior view of the facsimile apparatus. On the side of a body of the facsimile apparatus of this invention, the paper saving request switch 24 is provided.

FIGS. 4A to 4C are illustrations of this invention for showing conditions of recording the video signal on the recording paper 22 in the normal size printing mode, the half size printing mode, and the fine mode respectively.

In the general facsimile apparatus has a normal size printing mode for sending video information with a resolution of 3.85 [line/mm] in the sub-scanning direction, namely, in the vertical direction, and a fine mode for sending the video information with a resolution of 7.7 [line/mm]. The facsimile apparatus of this invention also has these modes. In FIGS. 4A to 4C, "d" is a unit distance of feeding the recording paper 16, namely, a distance of feeding the recording paper 16 by one step motion of the step motor 20. This is also referred to as a unit feeding amount. This distance is set to d=0.13 [mm] to obtain the fine mode. That is, in the fine mode, the recording paper is fed by one step motion of the step motor 20 at each printing of one horizontal line. On the other hand, in the normal size printing mode, the recording paper 16 is fed by two step motions at each printing of each set of video data. FIG. 4A shows an example of a paper recorded in the normal size printing mode. FIG. 4C shows an example of a paper recorded in the fine mode where the recording paper 16 is fed by one unit distance "d" every printing operation of one of horizontal lines L1 to L10. FIG. 4B shows an example of a paper recorded in the half size printing mode where the paper is fed by one unit distance "d" every printing operation of one of horizontal lines L1 to L5.

Hereinbelow will be described a receiving operation of the facsimile apparatus of the first embodiment. FIG. 2A shows a main flow chart of this invention which is commonly used in the first and second embodiments.

In step s9, the initial value of the file number 29 is set in step s9. That is, the control circuit 11 executes FN (file number value)=1. The file number 29 is only used in the second embodiment. In the following step s1, the control circuit 11 makes a decision as to whether or not a stored data print request signal generated by the stored data print request switch 23 is present. If the answer is YES (present), processing proceeds to a stored data print subroutine s2. After termination of the stored data print subroutine s2 mentioned latter, processing returns to step s1. If the answer is NO (absent) in step s1, processing proceeds to step s3. The control circuit 11 makes a decision as to whether or not a paper saving request switch 24 is ON in step 3. If the answer is YES (ON), processing proceeds to step s7. In step s3, if the answer is NO (OFF), processing proceeds to step s6. In the step s6, the control circuit executes an erasing subroutine s6. After processing of step s4 or the erasing subroutine s6, the control circuit 11 makes a decision as to whether or not the detected ring signal is present in step s7. If the answer is YES (present), processing proceeds to a subroutine s8 mentioned later. After termination of the processing in step 8, processing returns to step s1. In step s7, if the answer is NO (absent), processing returns to step s1.

Figure 2B:
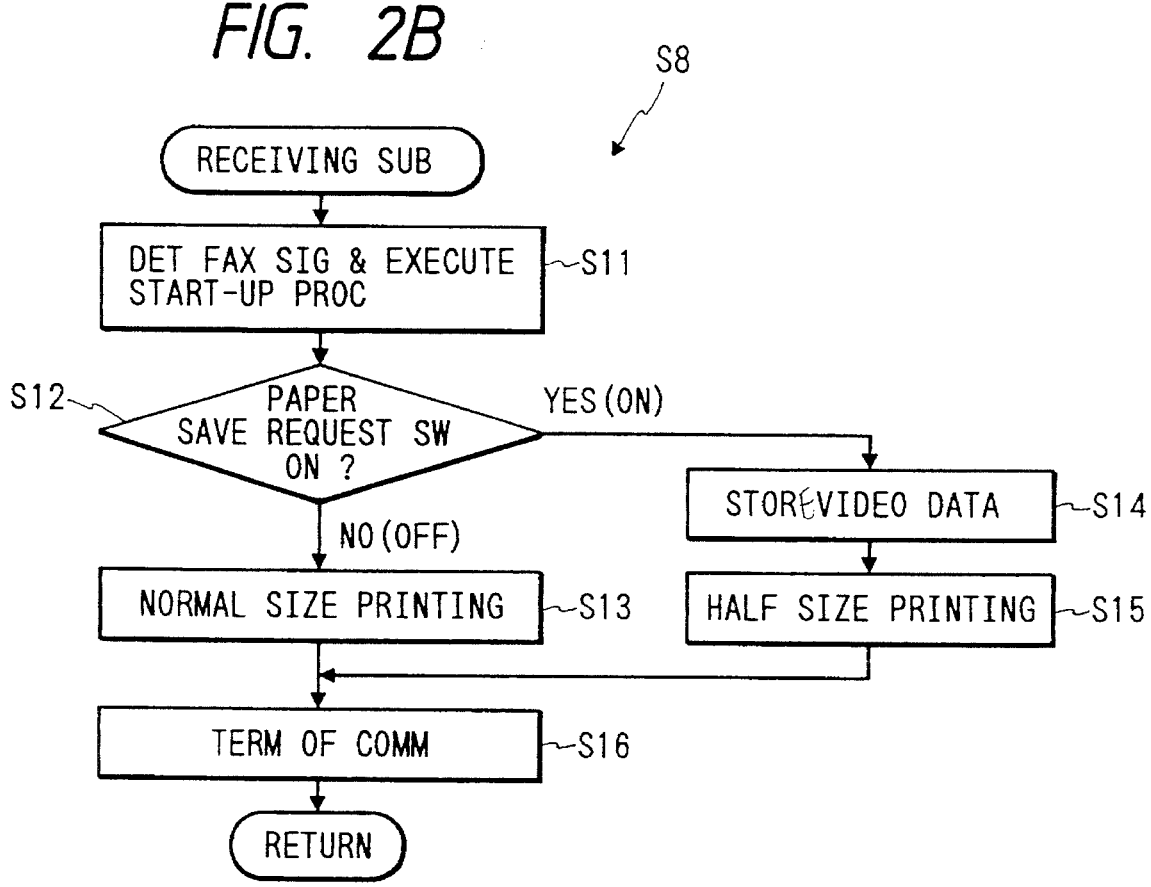
FIG. 2B shows a partial general flow chart of the receiving subroutine of this invention.

FIG. 2B shows a general flow chart of the receiving subroutine s8 of this invention.

In step s11 of the receiving subroutine s8, the control circuit 11 detects the facsimile signal incoming from the telephone line 1 and executes a start-up processing, i.e., exchanges control conditions with the calling facsimile for example. In the following step s12, the control circuit 11 makes a decision as to whether or not the paper saving request switch 24 is ON. If the answer is YES (ON), processing proceeds to step s14. In the step s14, the control circuit 11 stores the received video data in the video memory 22. In the following step s15, the control circuit 11 executes a half size printing. In step s12, if the answer is NO (OFF), processing proceeds to step s13. In the step s13, the control circuit 11 executes the normal size printing. After processing of step s13 or s15, the control circuit 11 terminates the communication, namely, release the telephone line 1, and then, processing returns to the main processing.

Figure 2C:
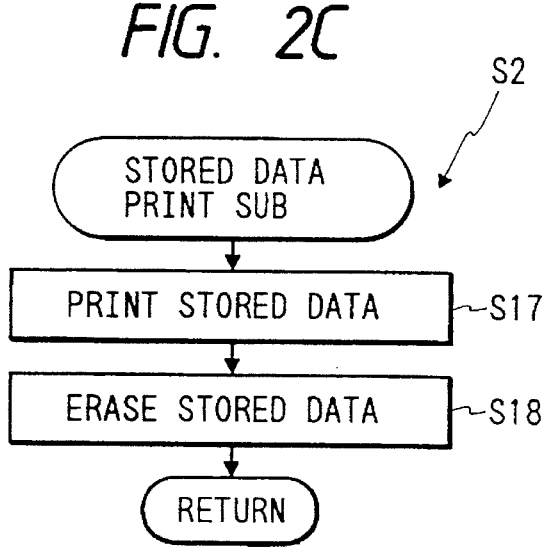
FIG. 2C shows a partial general flow chart of this invention for showing the stored data print subroutine.

FIG. 2C shows a general flow chart of this invention for showing the stored data print subroutine s2.

In step s17 of the receiving subroutine s2, the control circuit 11 prints an image on the basis of the stored data. In the following step s18, the control circuit 11 erases the stored data in the video memory 22. Then, processing returns to the main processing.

Figure 3:
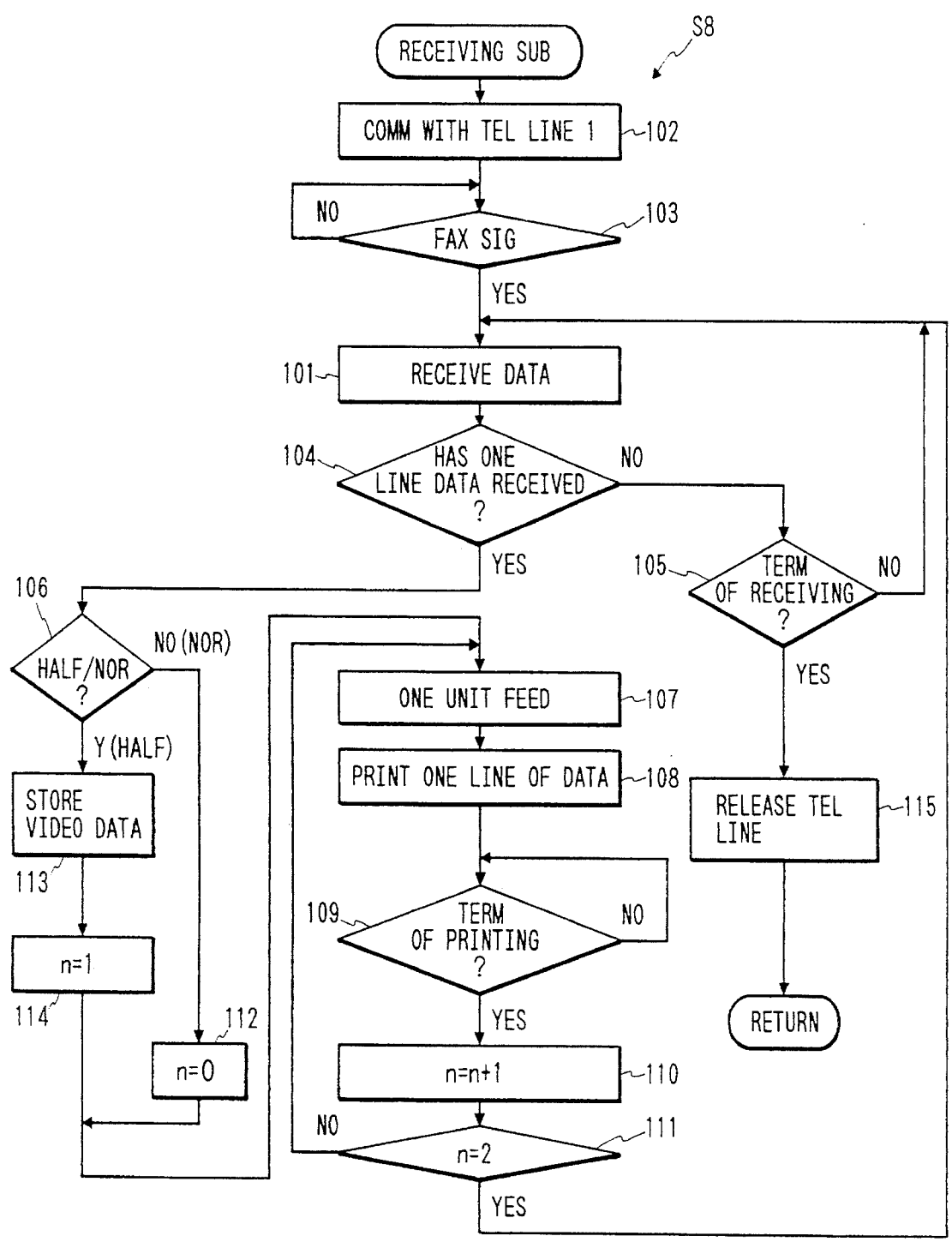
FIG. 3 shows a detailed flow chart of this invention for showing the receiving subroutine.

FIG. 3 shows a detailed flow chart of this invention for showing the receiving subroutine s8.

In step 102 of the receiving subroutine s8, the control circuit 11 communicates with the telephone line 1 by controlling the interface circuit 3. In the following step 103, the control circuit 11 detects the facsimile signal incoming from the telephone line 1 and executes a start-up processing, i.e., communicating with the calling party (other facsimile apparatus) under a predetermined protocol using the facsimile signal receiving circuit 6 and the facsimile signal transmitting circuit 5. If the start-up condition is established processing proceeds to step 101. In step 101, the control circuit 11 receives the transmitted data from the telephone line 1 through the facsimile signal receiving circuit 6 and stores the data in the buffer memory 12 after the run-length conversion. In the following step 104, the control circuit 11 makes a decision as to whether or not one horizontal line of the video data has been received. If the answer is YES, then processing proceeds to step 106. In step 106, the control circuit 11 makes a decision as to whether or not the half size printing should be executed. If the answer is NO (normal size printing), the control circuit 11 executes the normal size printing from the step s112 as follows:

In the step 112, the control circuit 11 enters zero to the counter 14, that is, executes n=0. In the following step 107, the control circuit 11 controls the drive circuit 13 to cause the paper feeding unit 9a to feed the recording paper 16 by one unit feeding amount (0.13 mm) which is executed by one unit step motion of the step motor 20. In the following step 108, the control circuit 11 controls the drive circuit 13 to cause the thermal head 9b to print one line of the video data stored in the buffer memory 12. After termination of the printing in step 109, the control circuit 11 adds one to the counter 14, namely, executes n=n+1 in the following step 110. Then, the control circuit 11 makes a decision as to whether or not n=2 in the following step 111. If the answer is NO, processing returns to the step 107 and repeats the processing from the steps 107 to 110. That is, the same data in the buffer memory 12 is printed again after one unit feeding (0.13 mm). FIG. 4A shows this condition. That is, the first printing L1a and the second printing L1b form the same printed pattern. After the second execution of the processing of the step 110. The control circuit makes a decision as to whether or not n=2 in the following step 111. Since the answer is YES, processing returns to the step 101 and repeats the processing from the steps 104 to 111 again. That is, the control circuit 11 receives the video data of the next line L2, in fact, L2a and repeats this to form the reproduce horizontal lines.

In step 104, if the one line data has not received, the control circuit checks whether the data receiving has been terminated in step 105. If the data receiving has been terminated in step 105, the control circuit 11 causes the interface circuit 3 to release the telephone line 1 in step 115 and processing returns to the main program.

In the step 105, if the data receiving has not been finished, processing returns to the step 101 to receive the video data.

In step 106, if the answer is YES (half size printing), the paper saving printing (half size printing) is executed from the step 113 as follows:

In the step 113, the control circuit 11 stores the video data once stored in the buffer memory 12 in the video memory 22. In fact, a plurality sets of the video data may be stored in the video memory 22 because there may be a plurality of facsimile callings. Therefore, a set of the video data is stored in every file of the video memory 22. In the following step 114, the control circuit 11 sets one to the counter 14, i.e., executes n=1, to perform the half size printing. In the following step 107, the control circuit 11 controls the drive circuit 13 to cause the paper feeding unit 9a to feed the recording paper 16 by one unit step feeding (0.13 mm). In the following step 108, the control circuit 11 controls the drive circuit 13 to cause the thermal head 9b to print one line of the video data stored in the buffer memory 12. After termination of the printing in step 109, the control circuit 11 adds one to the counter 14, namely, executes n=n+1 in the following step 110. Then, the control circuit 11 makes a decision as to whether or not n=2 in the following step 111. Since n=2, processing returns to step 101. That is, the data stored in the buffer memory 12 is printed once after one unit feeding (0.13 mm). FIG. 4B shows this condition. That is, the first printing L1 and the second printing L1 form the different printed patterns. After the processing of the step 111, processing returns to the step 101 and repeats the processing from the steps 104 to 111 again. That is, the control circuit 11 receives the video data of the next line L2 and repeats this to form the reproduced horizontal lines with the vertical size reduced. That is, in the paper saving mode, one horizontal line of video data is printed every one unit feeding (0.13 mm), so that the vertical length of the recorded image is reduced to half. Therefore, the consumption of the recording paper 16 is reduced.

Figure 16A:
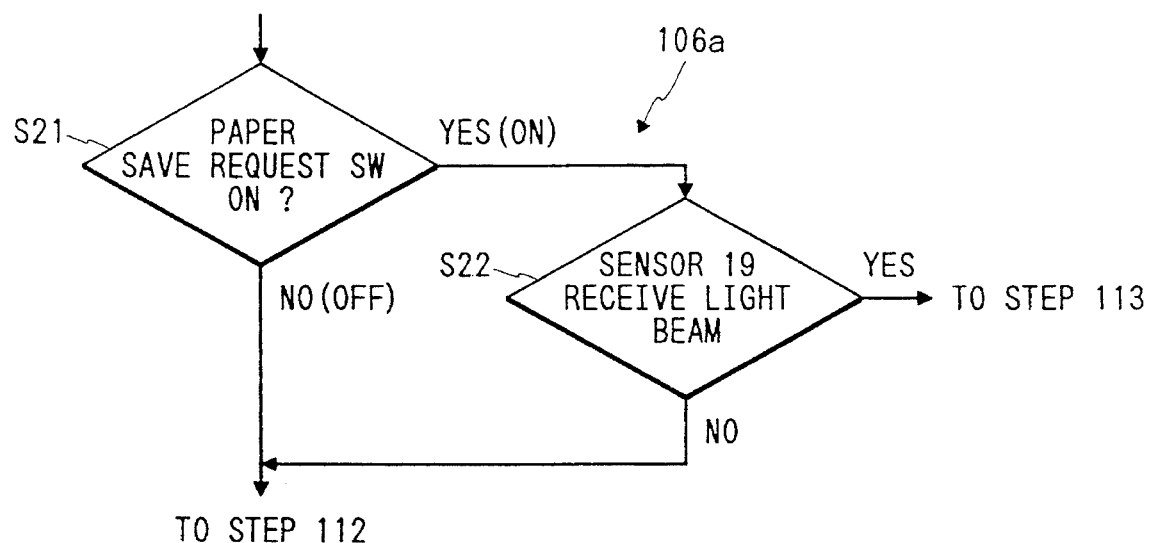
FIGS. 16A to 16C show partial flow charts of this invention.
Figure 16B:
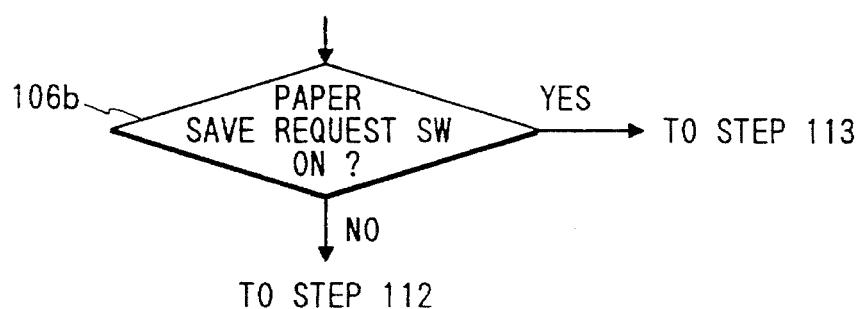
Figure 16C:
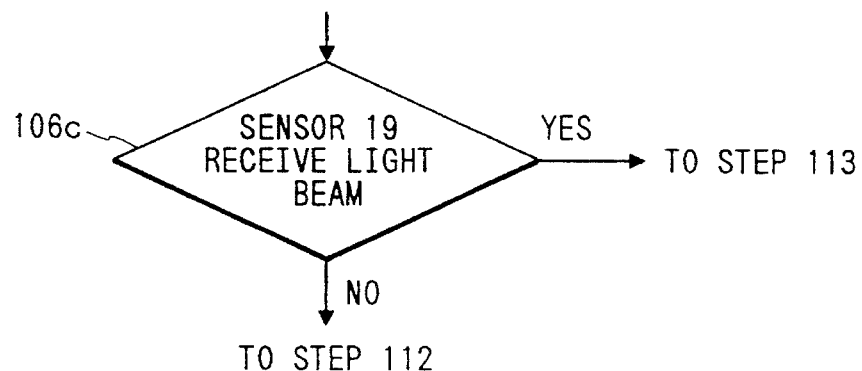

In the step 106, the control circuit 11 made the decision as to whether the half size print should be executed. Concretely, this judgement can be done in various ways. FIGS. 16A to 16C show partial flow chart of this invention. In FIG. 16A, at first the control circuit 11 makes a decision as to whether the paper saving request switch is ON or OFF. If the paper saving request switch 24 is ON, in the following step s22, the control circuit makes a decision as to whether or not the photosensitive device 19 detects the light beam from the light emitting device 18, i.e., as to whether or not the amount of the remaining recording paper is less than the given value. If the amount of the remaining recording paper is less than the given value, processing proceeds to step 113 to execute the half size printing and store the video data. In this case, until it is detected that the amount of the remaining recording paper decreases under the given value, the recorded copy is printed in the normal size printing mode.

In FIG. 16B, the paper saving request signal is generated by the paper saving request switch 24. In other word, the paper saving request signal is generated only in response to the manual operation of the user. In FIG. 16C, the paper saving request signal is generated by the output of the photosensitive device 19 automatically. That is, the photosensitive device 19 outputs the the paper saving request signal when the amount of the remaining recording paper is less than the given value.

Figure 7A:
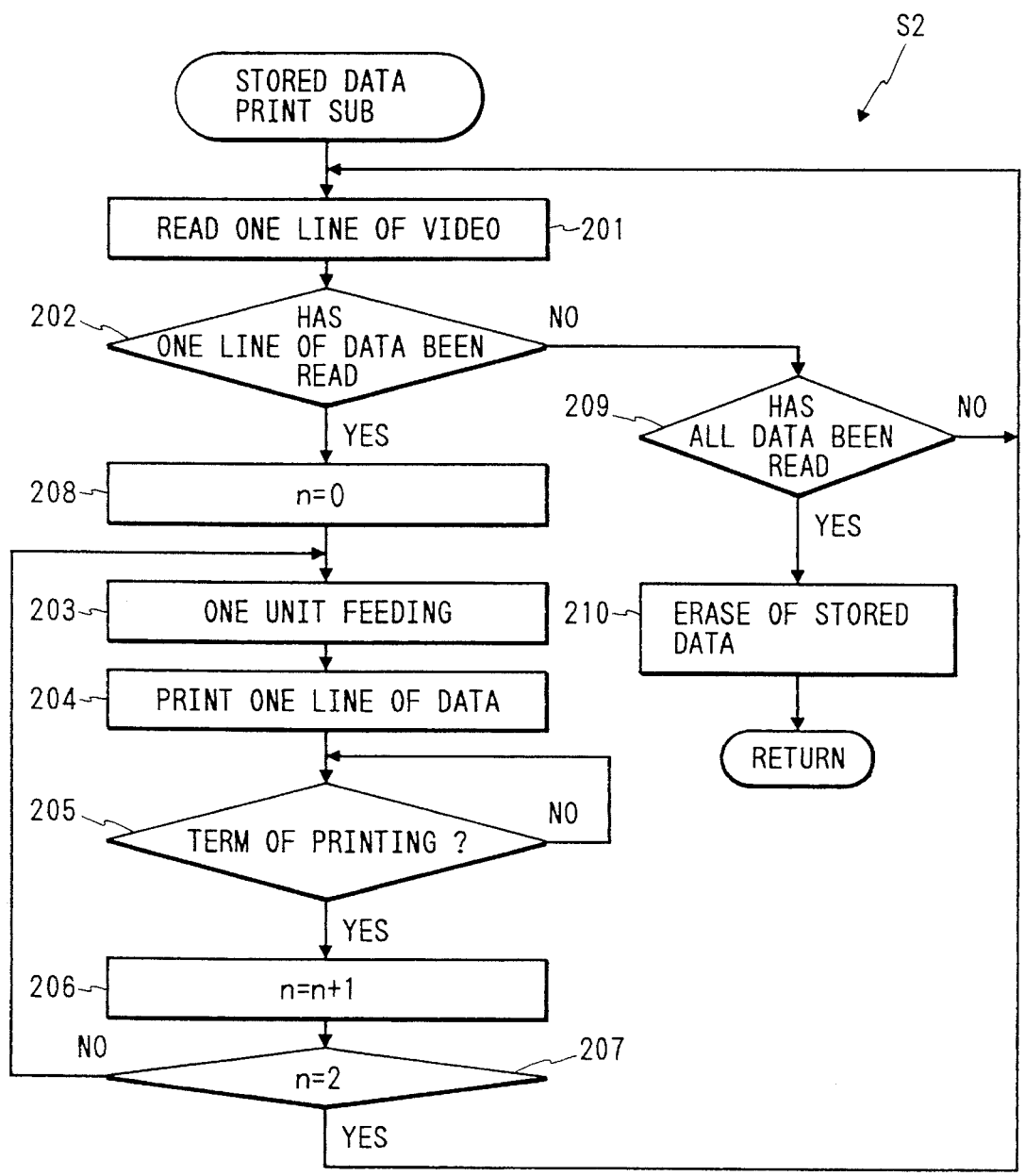
FIG. 7A shows a flow chart of this invention for showing the stored data print subroutine.

FIG. 7A shows a flow chart of this invention for showing the stored data print subroutine s2.

In step 201, the control circuit 11 reads the stored data from the video memory 22 and stores the read data in the buffer memory 12. In the following step 202, the control circuit 11 makes a decision as to whether or not one horizontal line of the video data has been read. If the answer is YES, then processing proceeds to step 208. In the step 208, the control circuit 11 enters zero to the counter 14, that is, executes n=0. In the following step 203, the control circuit 11 controls the drive circuit 13 to cause the paper feeding unit 9a to feed the recording paper 16 by one unit feeding (0.13 mm) which is executed by one unit step motion of the step motor 20. In the following step 204, the control circuit 11 controls the drive circuit 13 to cause the thermal head 9b to print one line of the video data stored in the buffer memory 12. In the following step 205, the control circuit 11 waits the termination of the printing. After termination of the printing, the control circuit 11 adds one to the counter 14, namely, executes n=n+1 in the following step 206. Then, the control circuit 11 makes a decision as to whether or not n=2 in the following step 207. If the answer is NO, processing returns to the step 203 and repeats the processing from the steps 203 to 206. That is, the same data in the buffer memory 12 is printed after one unit feeding again. FIG. 4A shows this condition. That is, the first printing L1a and the second printing L1b form the same printed pattern. After the second execution of the processing of the step 207. The control circuit 11 makes a decision as to whether or not n=2 in the following step 207. Since the answer is YES, processing returns to the step 201 and repeats the processing from the steps 201 to 207 again. That is, the control circuit 11 receives the video data of the next line L2, in fact, L2a and repeats this to form the reproduce horizontal lines.

In step 202, if the one line data has not received, the control circuit 11 checks whether the data reading has been terminated in step 209. If the answer is YES, the control circuit 11 erases the stored data which has been read and printed. In fact, the stored data is not erased but is invalid. After processing of the step 210, processing returns to the main program. In step 209, the answer is NO, processing returns to step 201.

FIG. 7B shows a flow chart of this invention for showing the erasing subroutine of the stored data.

In step 211, the control circuit 11 makes a decision as to whether or not all video data has been erased. If the answer is YES, then processing returns to the main program. In step 211, if all data has not erased, the control circuit 11 erases the stored data in the video memory 22, in fact, the control circuit 11 causes the stored data to be invalid. Then, processing returns to step 211.

As mentioned above, in this embodiment, when the paper saving printing is requested, each horizontal line of video data is printed once unit feeding of the recording paper 16. Therefore, a copy is printed with a half vertical length of that would be printed in the normal size printing mode because in the normal size printing mode the same video data of one horizontal line is successively printed after twice unit feedings of the recording paper 16. Therefore, the consumption of the recording paper 16 is reduced as well as the copy recorded in the half size printing mode can be reproduced by reading the video data stored during the half size printing and by printing the read video data in the normal size mode. FIG. 5 is an illustration of this embodiment of a printed copy prepared in the normal size printing mode. FIG. 6 is an illustration of this embodiment of a printed copy prepared in the half size printing mode. Therefore, this allows the user not to request the calling party to send the video copy again to obtain the normal size copy.

Moreover, in FIG. 3, judgement for execution of the half size printing is made every printing of the horizontal line. However, this judgement may be done every printing of page.

Figure 10:
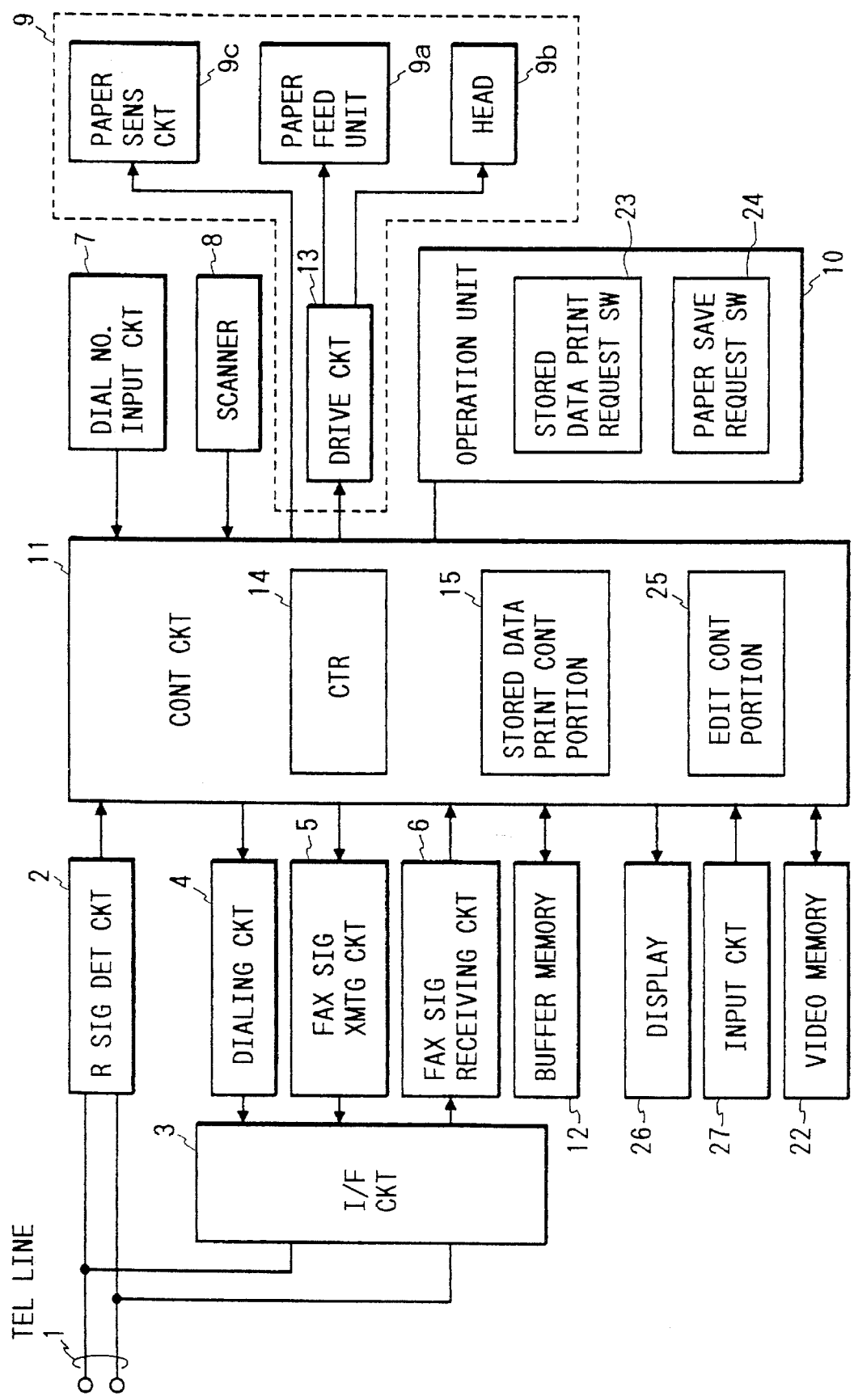
FIG. 10 is a block diagram of the second embodiment of the facsimile apparatus.

Hereinbelow will be described a second embodiment of a facsimile apparatus of this invention. FIG. 10 is a block diagram of the second embodiment of the facsimile apparatus. The basic structure and basic operations are the same as those of the first embodiment. Therefore, the detailed description for the common portion is omitted.

In the second embodiment, there are further provided an editing portion 25 for selectively printing a copy on the basis of the stored data which has been transmitted through the telephone line 1; a display 26 for displaying a portion of the copy or document, an instruction for editing, and conditions of the editing operation; and an input circuit 27 for inputting the instruction for editing.

Figure 11:
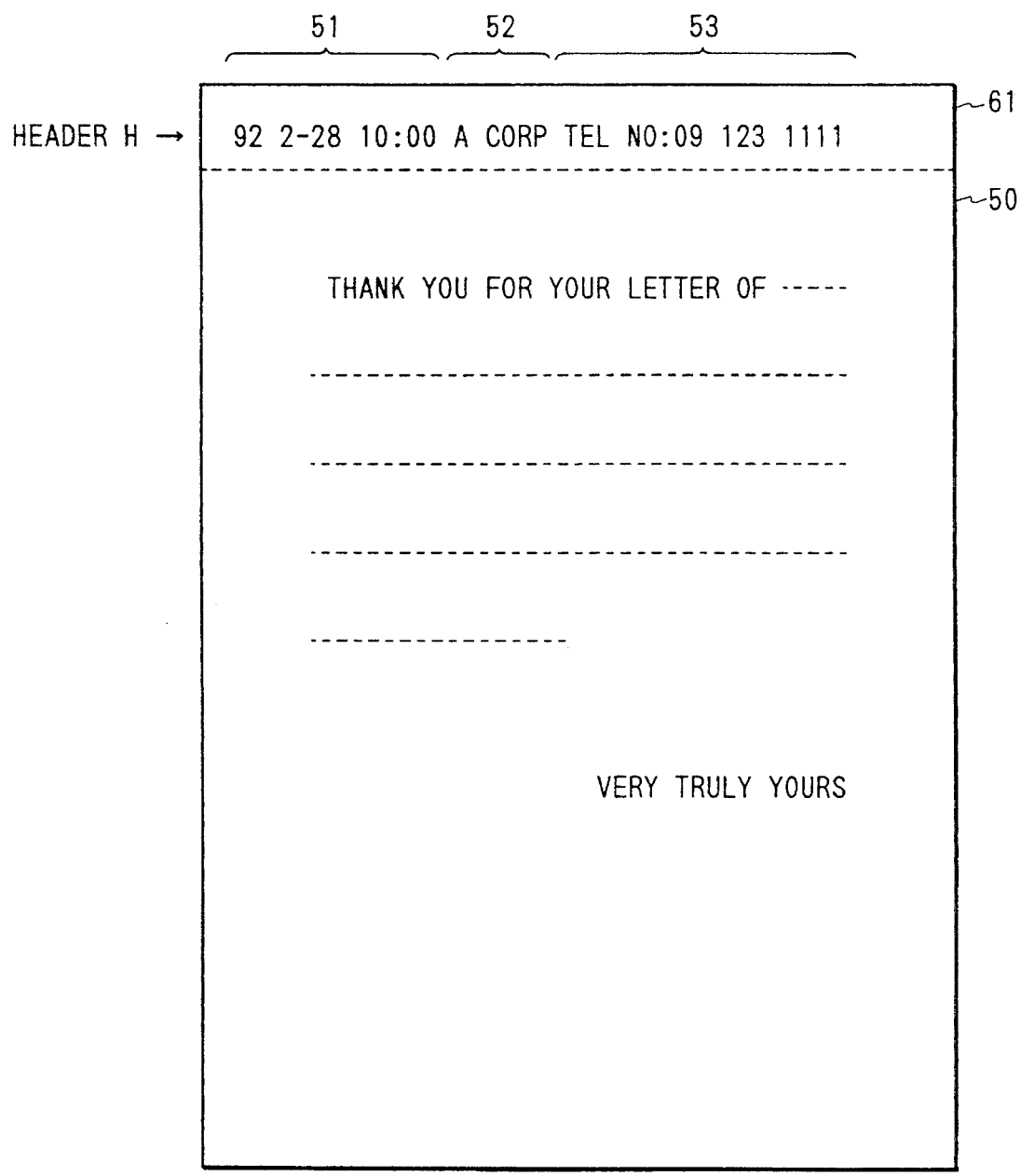
FIG. 11 is an illustration of the second embodiment for showing a copy printed by the facsimile apparatus of the second embodiment.

FIG. 11 is an illustration of the second embodiment for showing an example of a copy printed by a general facsimile apparatus. There are many facsimile apparatus in current use which sends a transmitted copy with a header H. Such facsimile apparatus adds the header image to the video data read from the original copy by the scanner as shown in FIG. 11 at top of every page. The control circuit 11 extracts video data at top of a first page of transmitted video data. That is, the control circuit 11 extracts the transmitted video data at predetermined region 61 and produces header information by the file number and outputs the header H to the printer unit 9 and causes the printer 9 to print the header H at the top portion of the printed copy. Generally the header H includes a time portion 51, the name 52 of the calling party, and the telephone number 53 of the calling party. They provide sufficient information to the user who sent the copy. However, any portion which is extracted from the top page can be used if such a portion includes the information for identifying the person who sent the copy. FIG. 12 is an illustration of the second embodiment of the outputted copy, namely a list of headers. The control circuit 11 generates the file number 29 and stores the transmitted data in the video memory 22 in associated with the file number 29 in the paper saving mode. More specifically, the control circuit 11 produces and stores a table (not shown) including start addresses of all files and the file numbers correspondingly. The display 26 comprises, for example, a CRT display apparatus or a liquid crystal display apparatus. The input circuit 27 comprises, for example, a keyboard.

Figure 13:
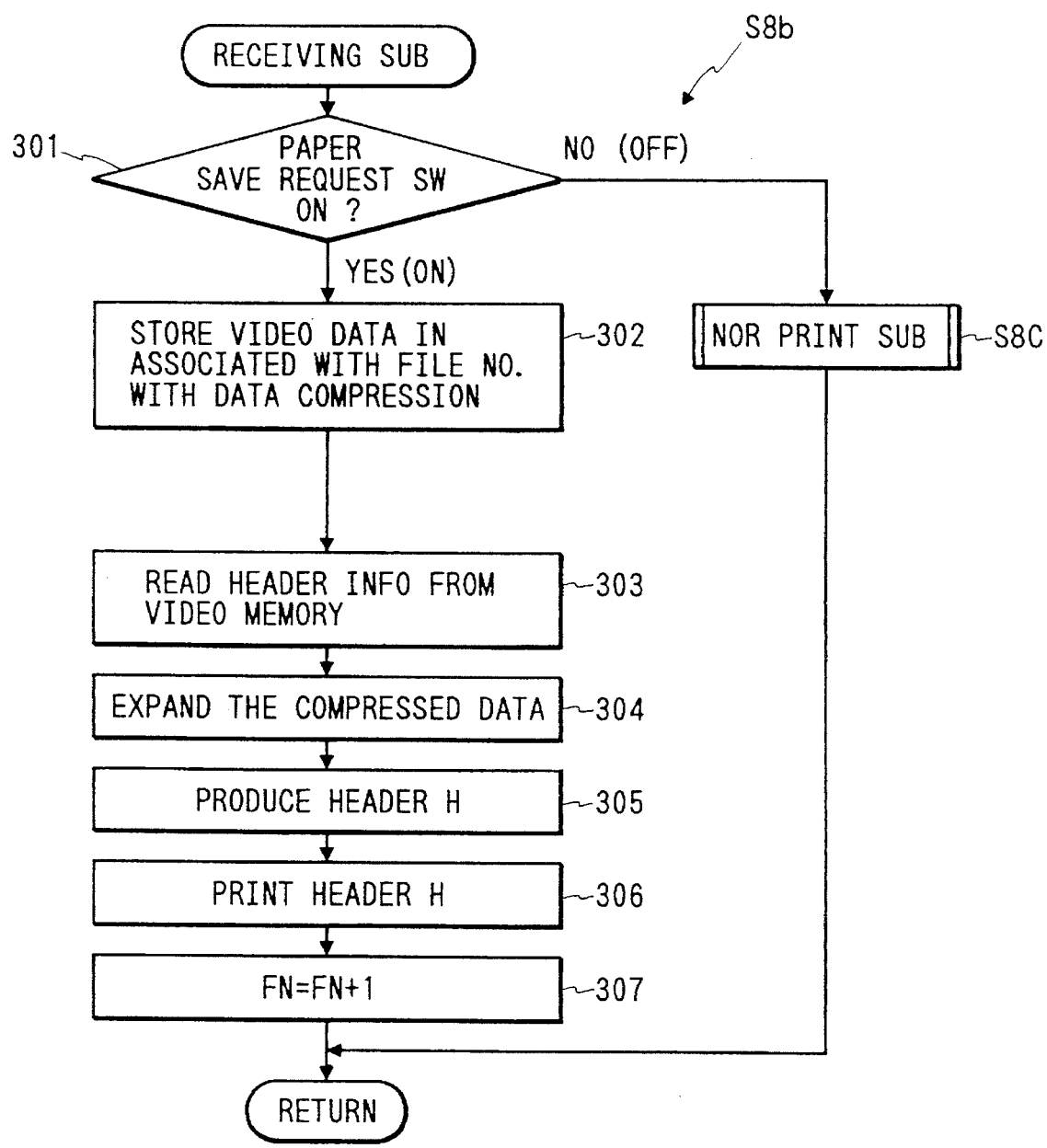
FIG. 13 is a partial flow chart of the facsimile apparatus of the second embodiment.
Figure 14:
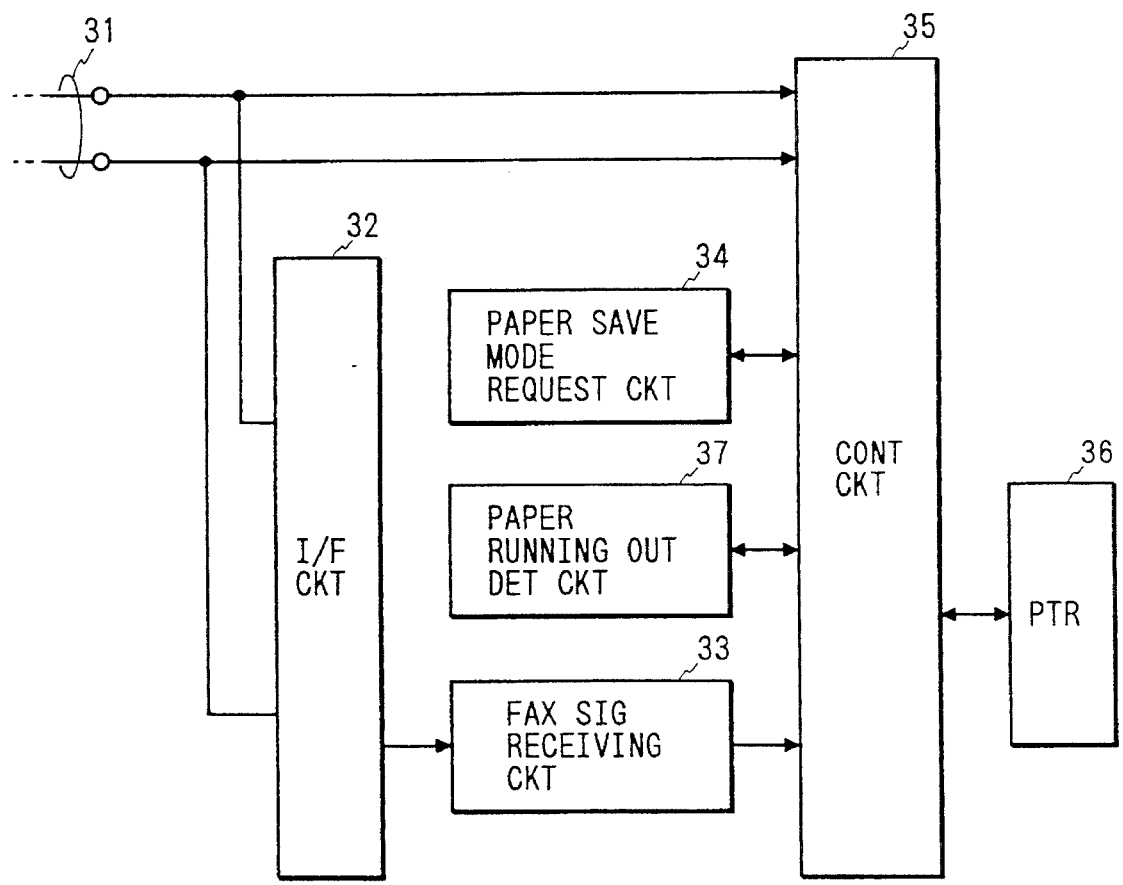
FIG. 14 is a block diagram of a prior art facsimile apparatus with the paper saving function.
Figure 15:
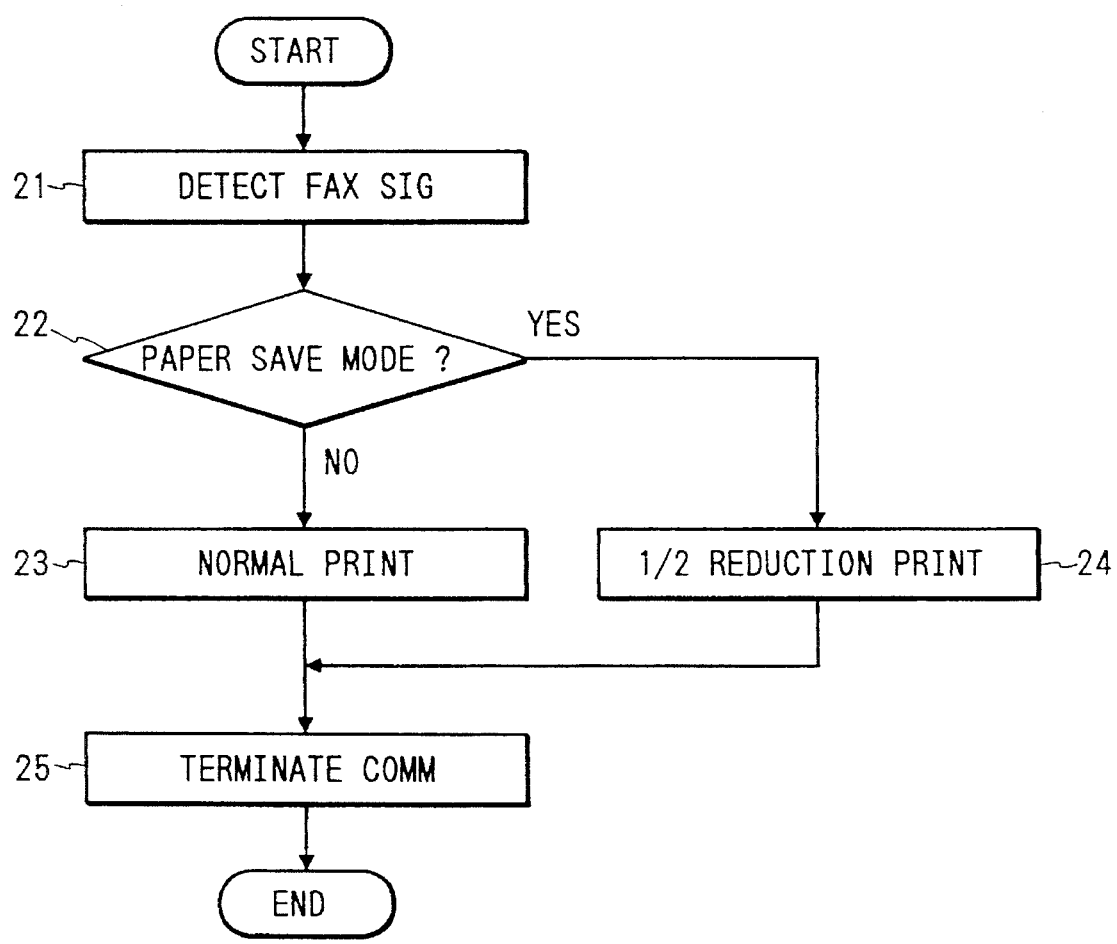
FIG. 15 shows a flow chart for showing the operation of the prior art facsimile apparatus shown in FIG. 14

FIG. 13 is a partial flow chart of the facsimile apparatus of the second embodiment. The main program is the same as the first embodiment as shown in FIG. 2A. In FIG. 2A, the initial value of the file number 29 is set in step s9. That is, the control circuit executes FN (file number value)=1. When the ring signal is detected in step s7, processing proceeds to a receiving subroutine s8b.

FIG. 13 is a partial flow chart of the second embodiment which shows the receiving subroutine s8b. After processing of the step s7 in the main program, the control circuit 11 executes step 301. The control circuit 11 makes a decision as to whether or not the paper saving request switch 24 is ON. If the paper saving request switch 24 is OFF, processing proceeds to a normal size print subroutine s8c which is basically the same as the process of the receiving subroutine shown in FIG. 3 but processing of steps 106, 113, 114 are omitted. That is, after processing of the step 104 processing proceeds to step 112 directly when the answer is YES in step 104.

In step 301, if the answer is YES, i.e., the paper saving request switch is ON, processing proceeds to step 302. The control circuit 11 stores the video data received by the facsimile signal receiving circuit 6 in association with the file number 29 in the video memory 22. That is, the control circuit 11 produces and stores the table and stored the header information and the video data at a portion of the video memory 22 indicated by the address corresponding to the file number 29. Moreover, the control circuit 11 effects data compression to the header information to reduce the memory space in the step 302 also. When the reception and storing of the video data are terminated, the control circuit 11 reads the header information from the video memory 22 using the file number and the table in step 303. More specifically the control circuit 11 reads only top portion of the stored data for producing the header information. In the following step 304, the control circuit 11 executes an expansion of the read header information to obtain the header H. Then, the control circuit 11 prints the file number 29 and the header H using the printer unit 9. In the following step 307, the control circuit 11 executes FN=FN+1. Then, processing returns to the main program. When the next transmission comes the control circuit 11 stores the header and the video data using the file number FN=2. Therefore, the printed copy forms a list of transmitted copies or document as shown in FIG. 12. Therefore, the user can easily select a desired transmitted data. At the first line, the header H of the file number FN=1 is printed with the file number at the leftmost portion. At the second line, the header of the file number FN=2 is printed with the file number. Therefore, the user can determine which file is printed in accordance with the user's preference. When the user desires to output the desired video data, the user operates the stored data print request switch 23. In response to this, the control circuit executes a stored data print subroutine s2b shown in FIG. 2A. FIG. 17 shows a partial flow chart of the facsimile apparatus of the second embodiment. In fact, the edit control portion 25 performs the stored data print subroutine s2b. After processing of the step 1 in the main program, the control circuit 11 executes step 401. In step 401, the control circuit 11 causes the display 26 to display a message "FILE NO. ?". In response to this, the user inputs the file number which has determined in accordance with the printed file list shown in FIG. 12. In step 402, the control circuit 11 receives the inputted file number. In the following step 403, the control circuit 11 makes a decision as to whether or not the input file number is zero. If the input file number is not zero, processing proceeds to step 403. Then, the control circuit 11 determines the start address of the detected file number using the table in step 404. In the following step i.e., the stored data print subroutine s2 which is the same as the first embodiment, the control circuit 11 reads and prints the stored video data by the printer unit 9.

In step 403, if the input file number is zero, processing proceeds to step 405. In step 405, the control circuit 11 reads the headers of the stored video data and cause the display 26 to display the file list as similar to the printed file list shown in FIG. 12 in order to provide information for selection of documents. Then, processing returns to step 401.

As described above, in the paper saving mode, the facsimile apparatus of the second embodiment detects the header information and stores the transmitted data and detected header information in the video memory 22 in associated with file numbers as well as outputs a list of the stored data. The user can print the stored data with reference to the printed list of the stored data.

What is claimed is:

1. A facsimile apparatus comprising:
   (a) receiving means for receiving a facsimile signal transmitted through a telephone line;
   (b) printing means for printing an image on a recording paper on the basis of received video data included in said facsimile signal in first and second modes, said printing means including a printing head and paper feeding means for feeding recording paper in a vertical direction along a longitudinal direction of said recording paper, wherein said printing means effects a printing operation with said printing head using said received video data in first and second modes, and said feeding means feeds said recording paper during said printing operation by first and second amounts of said recording paper for each line of the received video data in said first and second modes respectively, said second amount of said recording paper being larger than said first amount of said recording paper, wherein a capability of recording said received video data on remaining recording paper is increased;
   (c) storing means for storing said received video data;
   (d) first control means responsive to a mode signal, indicative of a first mode and a second mode, for controlling said printing means to print said image on said recording paper using said first mode on the basis of said received video data and controlling said storing means to store said received video data when said mode signal is indicative of said first mode, and for causing said printing means to print said image on said recording paper using said second mode on the basis of said received video data when said mode signal is indicative of said second mode, wherein said printing means prints said image on said recording paper with said image contracted in the longitudinal direction of said recording paper in said first mode as compared with said image printed in said second mode, such that less recording paper is used in said first mode than in said second mode; and
   (e) second control means responsive to a command signal for reading said received video data stored in said storing means and controlling said printing means to print said image using said second mode on the basis of the received video data read from the storing means.

2. A facsimile apparatus as claimed in claim 1, further comprising:
   switch means responsive to a manual operation of a user of said facsimile apparatus for generating said mode signal.

3. A facsimile apparatus as claimed in claim 1, further comprising:
   detection means for detecting whether or not an amount of said recording paper which has been not printed is less than a predetermined value and for generating said mode signal indicative of said first mode when said amount of said recording paper is less than said predetermined value.

4. A facsimile apparatus as claimed in claim 1, further comprising:
   (a) switch means responsive to a manual operation of a user of said facsimile apparatus for generating a paper saving request signal;
   (b) detection means for detecting whether or not an amount of said recording paper which has been not printed is less than a predetermined value and for generating said mode signal indicative of said first mode when said amount of said recording paper is less than said predetermined value and said switch means generates said paper saving request signal.

5. A facsimile apparatus comprising:
   (a) receiving means for receiving a facsimile signal transmitted through a telephone line, said facsimile signal including video data;
   (b) printing means including a printing head having a printing element array arranged in a horizontal direction, and paper feeding means for feeding recording paper in a vertical direction along a longitudinal direction of said recording paper, wherein said printing means effects a printing operation with said printing element array using said video data in first and second modes, and said feeding means feeds said recording paper during said printing operation by first and second amounts of said recording paper for each line of video data in said first and second modes respectively, said second amount of recording paper being larger than said first amount of recording paper;
   (c) storing means for storing said video data in said first mode of operation and not storing said video data in said second mode of operation;
   (d) first control means responsive to a mode signal, indicative of said first and second modes, for controlling said printing means to effect said printing operation in said first mode and controlling said storing means to store said video data when said mode signal indicates said first mode, and for controlling said printing means to effect said printing operation in said second mode and controlling said storing means not to store said video data when said mode signal indicates said second mode; and (e) second control means response to a command signal for reading said video data stored in said storing means in said first mode and causing said printing means to effect said printing operation in said second mode using said video data read from said storing means.

6. A facsimile apparatus as claimed in claim 5, further comprising:

switch means responsive to a manual operation of a user of said facsimile apparatus for generating said mode signal.

7. A facsimile apparatus as claimed in claim 5, further comprising:

detection means for detecting whether or not an amount of said recording paper which has been not printed is less than a predetermined value and for generating said mode signal indicative of said first mode when said amount of said recording paper is less than said predetermined value.

8. A facsimile apparatus as claimed in claim 5, further comprising:

(a) switch means responsive to a manual operation of a user of said facsimile apparatus for generating a paper saving request signal; and (b) detection means for detecting whether or not an amount of said recording paper which has been not printed is less than a predetermined value and for generating said mode signal indicative of said first mode when said amount of said recording paper is less than said predetermined value and said switch means generates said paper saving request signal.

9. A facsimile apparatus responsive to a facsimile signal including video data and message information, comprising:

(a) receiving means for receiving said facsimile signal including said video data and message information;

(b) printing means for selectively printing said video data and message information;

(c) storing means for storing said video data and message information in said first mode of operation and not storing said video data and message information in said second mode of operation;

(d) first control means responsive to a mode signal, indicative of said first and second modes, and to receipt of said facsimile signal by said receiving means for producing a file number associated with said facsimile signal, and for (i) controlling said storing means to store said video data and message information in association with said file number, reading said message information from said storing means with reference to said file number, and controlling said printing means to print only said message information read from said storing means on said recording paper when said mode signal indicates a first mode, and (ii) controlling said printing means to print both said video data and message information without storing said video data and message information in said storing means when said mode signal indicates a second mode;

(e) second control means responsive to a command signal including a desired file number for reading said video data and message information with reference to said desired file number from said storing means and controlling said printing means to print both said video data and message information read from said storing means.

10. A facsimile apparatus as claimed in claim 9, further comprising:

switch means responsive to a manual operation of a user of said facsimile apparatus for generating said mode signal.

11. A facsimile apparatus as claimed in claim 9, further comprising:

detection means for detecting whether or not an amount of said recording paper which has been not printed is less than a predetermined value and for generating said mode signal indicative of said first mode when said amount of said recording paper is less than said predetermined value.

12. A facsimile apparatus as claimed in claim 9, further comprising:

(a) switch means responsive to a manual operation of a user of said facsimile apparatus for generating a paper saving request signal; and (b) detection means for detecting whether or not an amount of said recording paper which has been not printed is less than a predetermined value and for generating said mode signal indicative of said first mode when said amount of said recording paper is less than said predetermined value and said switch means generates said paper saving request signal.

* * * * *